United States Patent
Tsukahara et al.

(10) Patent No.: US 7,782,496 B2
(45) Date of Patent: Aug. 24, 2010

(54) IMAGE SIGNAL PROCESSING CIRCUIT, IMAGE READING DEVICE, AND IMAGE FORMING APPARATUS

(75) Inventors: Hajime Tsukahara, Tokyo (JP); Tohru Kanno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 826 days.

(21) Appl. No.: 11/723,426

(22) Filed: Mar. 20, 2007

(65) Prior Publication Data
US 2008/0212146 A1 Sep. 4, 2008

(30) Foreign Application Priority Data
Mar. 20, 2006 (JP) ............................. 2006-076494

(51) Int. Cl.
*H04N 1/04* (2006.01)
(52) U.S. Cl. .................. 358/446; 258/518; 258/475; 258/1.9; 258/474; 382/190; 382/284; 348/222.1; 348/E5.031; 348/218.1
(58) Field of Classification Search .................. 358/446, 358/518, 475, 1.1, 445, 505, 474, 1.9; 382/190, 382/284, 275, 274; 348/222.1, E5.031, 218.1, 348/239.09
See application file for complete search history.

(56) References Cited

U.S. PATENT DOCUMENTS

| | | | |
|---|---|---|---|
| 4,638,350 A | | 1/1987 | Kato et al. |
| 4,891,692 A | * | 1/1990 | Outa .......................... 358/506 |
| 5,946,423 A | * | 8/1999 | Takahashi et al. ........... 382/284 |
| 6,032,864 A | | 3/2000 | Hamasuna |
| 7,515,820 B2 | * | 4/2009 | Nakai et al. .................. 396/125 |
| 7,679,651 B2 | * | 3/2010 | Tsunoda .................. 348/218.1 |
| 2001/0055430 A1 | * | 12/2001 | Takahashi et al. ........... 382/284 |
| 2005/0024246 A1 | * | 2/2005 | Fujihara et al. ............. 341/120 |
| 2008/0231918 A1 | * | 9/2008 | Nagase ....................... 358/483 |

FOREIGN PATENT DOCUMENTS

| | | |
|---|---|---|
| JP | 63-224475 | 9/1988 |
| JP | 06-189132 | 7/1994 |
| JP | 2000-122188 | 4/2000 |
| JP | 2003-037718 | 7/2003 |

OTHER PUBLICATIONS

European Search Report dated May 7, 2008, for counterpart European Application No. 07251167.8-1228.

* cited by examiner

*Primary Examiner*—Negussie Worku
(74) *Attorney, Agent, or Firm*—Harness, Dickey & Pierce, P.L.C.

(57) ABSTRACT

An image signal processing circuit including a gain control circuit capable of performing gain control operation, and an image reading device or an image forming apparatus incorporating the image signal processing circuit.

18 Claims, 17 Drawing Sheets

FIG. 14A    FIG. 14B
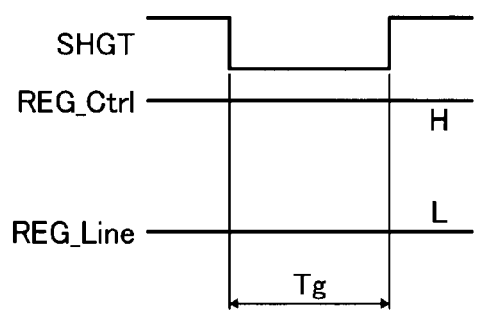
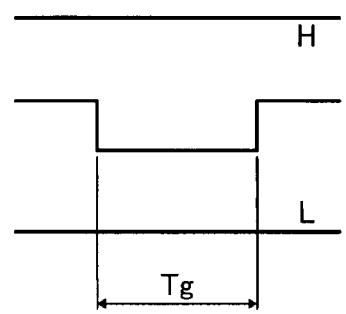
FIG. 14C    FIG. 14D
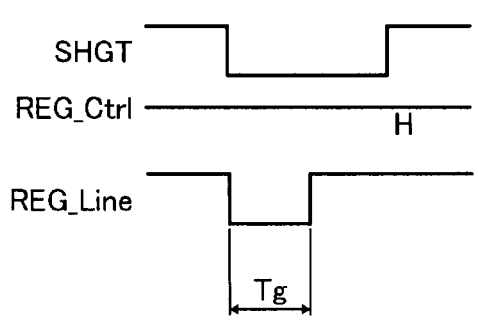
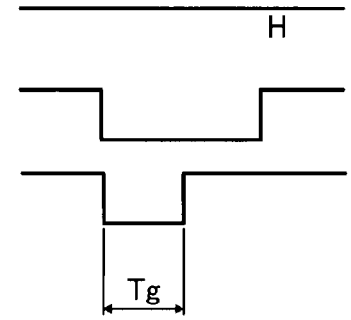

IMAGE SIGNAL PROCESSING CIRCUIT, IMAGE READING DEVICE, AND IMAGE FORMING APPARATUS

CROSS-REFERENCE TO RELATED APPLICATIONS

This patent application is based on and claims priority under 35 U.S.C. §119 to Japanese patent application No. 2006-076494 filed on Mar. 20, 2006, in the Japanese Patent Office, the entire contents of which are hereby incorporated by reference.

FIELD OF THE INVENTION

Example embodiments of the present invention relate generally to an image signal processing circuit, and an image reading device or an image forming apparatus incorporating the image signal processing circuit.

DESCRIPTION OF THE RELATED ART

As illustrated in FIG. 1A, an image reading device, which may be incorporated in an image forming apparatus, is provided with an optical writing device 101 that forms an optical image of an original, an image sensor 102 that converts the optical image into an image signal ("RO", "GO", "BO"), and an image signal processing circuit 103 that applies various signal processing to the image signal such as analog digital conversion before the image signal is output as image data ("DRO", "DGO", "BGO"). In this example, the image signal components RO, GO, and BO respectively correspond to the colors of red, green, and blue. The image data DRO, DGO, and BGO respectively correspond to the colors of red, green, and blue.

Before applying various signal processing such as analog digital conversion by using an analog digital converter ("ADC"), the image signal processing circuit 103 usually amplifies the image signal using a variable gain amplifier ("VGA"), for example, as described in the Japanese Patent No. 3262609 or the Japanese Patent Application Publication No. S63-224475. The gain of the variable gain amplifier is controlled by a controller 106, which is provided outside of the image signal processing circuit 103, such that the signal level of the image data output from the image signal processing circuit 103 is kept around a target level previously determined.

For example, the optical writing device 101 may be provided with a white reference board, which is used to obtain a white level value of the image data read by the image reading device. The gain of the variable gain amplifier may be controlled based on the determination result indicating whether the white level value obtained from the image data is substantially equal to a target white level value previously set for the image reading device. Referring to FIG. 1A, the averaging circuit 104 removes a noise component from the image data DGO, which corresponds to the green component of the image data obtained by reading the white reference board. The peak detector circuit 105 detects the peak value of the image data DGO, which indicates the white level value of the image data. The controller 106 determines whether the detected peak value is substantially equal to the target white level value, calculates the value of the gain when the detected peak value is not substantially equal to the target white level value, and outputs the calculated gain value to the image signal processing circuit 103. The calculated gain value is further input to the variable gain amplifier via a data address bus to be stored in a gain register provided in the variable gain amplifier. The variable gain amplifier amplifies the image signal with the gain having the calculated value stored in the gain register to adjust the white level value of the image data. The above-described gain control operation may be performed every time the image reading device or image forming apparatus is turned on. For example, the controller 106 may execute the gain control program every time the image reading device or image forming apparatus is turned on, and performs the gain control operation according to the gain control program.

However, performing the gain control operation using the software program may increase work load of the controller 106 or work required for designing the software program used by the controller 106. Further, in order to start the gain control operation, the controller 106 first needs to be activated, thus increasing time required for performing the gain control operation. Further, since the gain control operation is usually performed when the power of the image reading device or image forming apparatus is turned on, time required for starting up the image reading device or image forming apparatus may increase.

Further, since the controller 106 needs to communicate with the image signal processing circuit 103 via a cable, such as a harness, during the gain control operation, the reliability of the result obtained by performing the gain control operation may be low when communication between the controller 106 and the image signal processing circuit 103 are not reliable.

Further, since the controller 106 may not operate synchronously with the image signal processing circuit 103, it may not be clear when information regarding the peak value of the image data DGO is input to the controller 106. For this reason, the controller 106 may need to wait for a predetermined time period before starting the gain control operation. For example, as illustrated in FIG. 1B, the controller 106 outputs a sample hold gate signal SHGT having the low level to cause the peak detector circuit 105 to detect the peak value of the image data DGO. The image signal processing circuit 103 operates in synchronization with the line synchronization signal XLSYNC, which is input to the image signal processing circuit 103 by the optical writing device 101. Since the controller 106 is not synchronous with the line synchronization signal XLSYNC, the controller 106 waits for a predetermined time period Td to make sure that the peak value detection is completed before calculating and setting the gain during a time period Ts. In this example, the time period Td, which corresponds to the time in which the peak value detection is performed, is set substantially equal to two cycles of the line synchronization signal XLSYNC.

SUMMARY

In light of the above, there is a need for providing an image signal processing circuit in which the work or time required for performing the gain control operation is reduced, while keeping the reliability of the gain control operation.

In order to provide such image signal processing circuit, the function of gain control may be performed by the image signal processing circuit. For example, the image signal processing circuit may be additionally provided with a gain control circuit, which controls the gain of the variable gain amplifier based on the image data. The gain control circuit may include a signal level detector that detects a signal level of the image data output from the analog digital converter; and a gain calculating circuit that determines whether the detected signal level is substantially equal to a target level to generate a determination result, obtain an adjusted value of the gain of the variable gain amplifier based on the determination result, and sets the gain of the variable gain amplifier equal to the adjusted value such that the signal level of the image data is made substantially equal to the target level.

Alternatively or additionally, the image signal processing circuit may be provided with a gain control circuit, which controls the coefficient of a digital amplifier based on the image data, when the digital amplifier is provided. The gain control circuit may include a signal level detector that detects a signal level of the image data output from the output terminal; and a gain calculating circuit that determines whether the detected signal level is substantially equal to a target level to generate a determination result, obtain an adjusted value of the gain of the digital amplifier based on the determination result, and sets the gain of the digital amplifier equal to the adjusted value such that the signal level of the amplified image data is made substantially equal to the target level.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 14A to 14D are timing charts illustrating gain control operation, performed by the automatic gain control circuit shown in FIG. 13;

DETAILED DESCRIPTION OF THE INVENTION

Figure 1A:
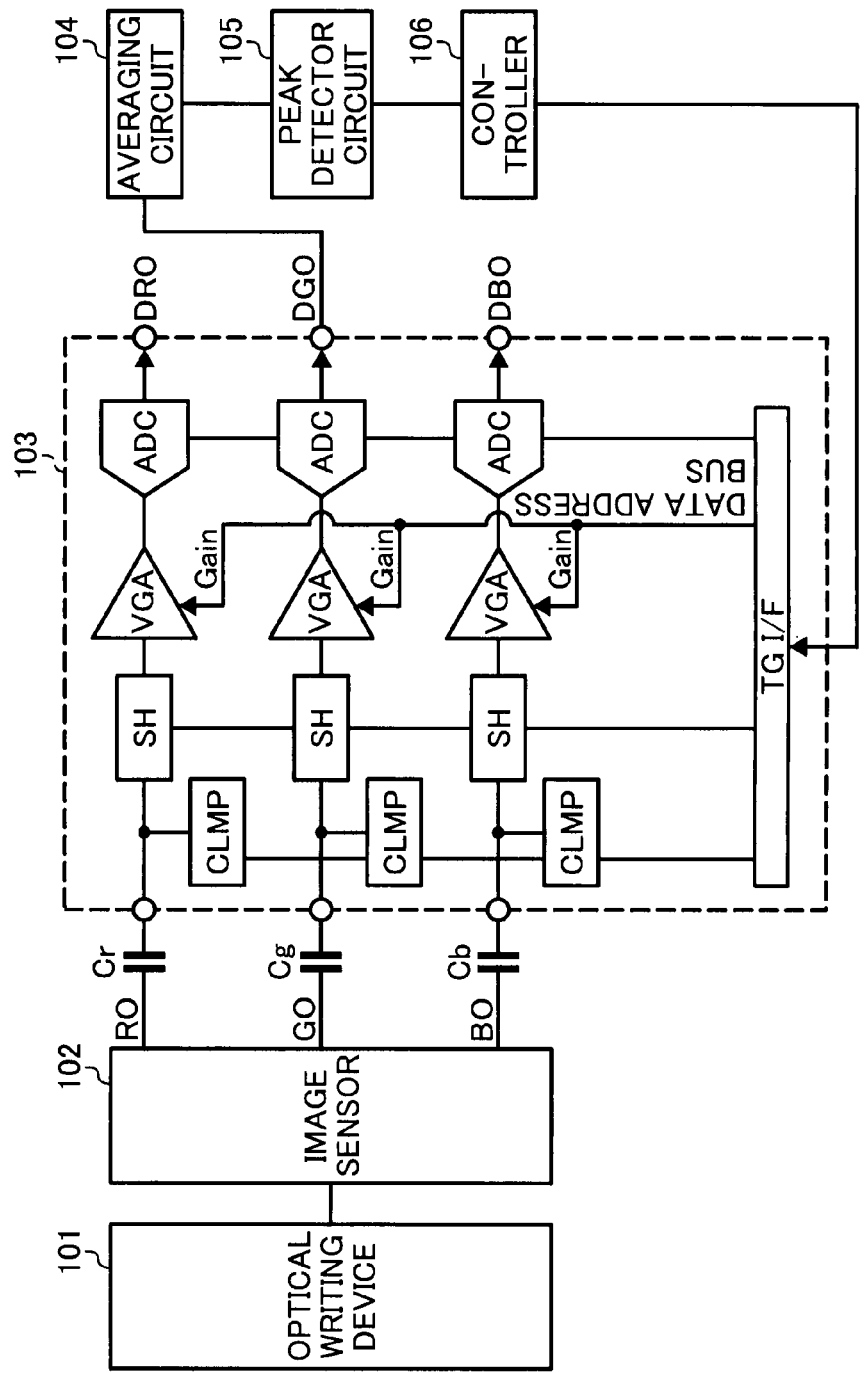
FIG. 1A is a schematic block diagram illustrating the structure of a background image reading device.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. For example, the singular forms "a", "an" and "the" are intended to include the plural forms as well, unless the context clearly indicates otherwise.

Figure 2:
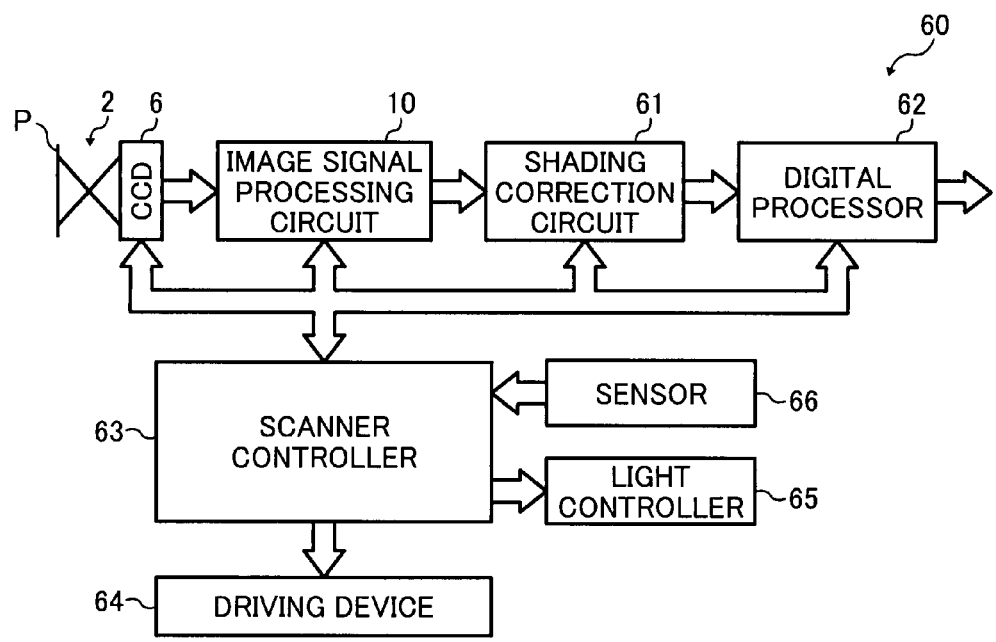
FIG. 2 is a schematic block diagram illustrating the structure of an image reading device, according to an example embodiment of the present invention.

Referring now to the drawings, wherein like reference numerals designate identical or corresponding parts throughout the several views, FIG. 2 illustrates a selected portion of an image reading device 60 according to an example embodiment of the present invention. The image reading device 60 may be implemented by a scanner capable of reading an original P into scanned data. The image reading device 60 includes an optical writing device 2, a charged coupled device (CCD) 6, an image signal processing circuit 10, a shading correction circuit 61, a digital processor 62, a scanner controller 63, a driving device 64, a light controller 65, and a sensor 66.

The optical writing device 2 forms an optical image of the original P on an imaging surface of the CCD 6, for example, as described below referring to FIG. 3. The CCD 6 converts the optical image into an analog image signal. In this example, the CCD 6 may be implemented by a color linear imaging sensor capable of outputting three image signal components respectively corresponding to the red color, the green color, and the blue color. Alternatively, the CCD 6 may output an image signal having a monochrome image signal component, when the original P is a monochrome image. The image signal processing circuit 10 applies various signal processing to the image signal components output from the CCD 6 including amplification and analog digital conversion, and output the image signals as image data.

The shading correction circuit 61 applies shading correction to the image data output from the image signal processing circuit 10, using shading correction data stored in a memory. The shading correction data may be obtained by reading a white reference board 8 (FIG. 3) provided in the optical writing device 2. The digital processor 62 applies various image processing to the image data, including, for example, magnification, gamma conversion, or color conversion. The processed image data is output as scanned data for further processing, for example, to a personal computer or a printer. Alternatively, the scanned data may be stored in any desired memory.

The scanner controller 63 controls operation of the image reading device 60. The scanner controller 63 may be implemented by a microprocessor, a memory used by the microprocessor such as a read only memory (ROM) or a random access memory (RAM), etc. The driving device 64 drives various devices provided in the image reading device 60, including, for example, a first carriage 3 (FIG. 3), a second carriage 4 (FIG. 3), or a cooling fan. The light controller 65 controls a light source 7 (FIG. 3) of the optical writing device 2 by turning on or off the light source 7. The sensor 66 detects various information, including the home position of the first carriage 3 or the second carriage 4, the temperature of the light source 7, etc.

Figure 3:
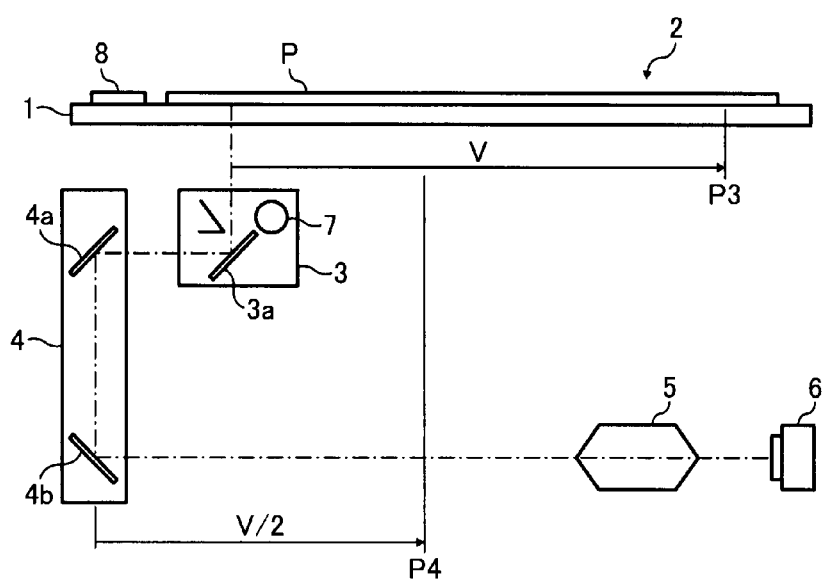
FIG. 3 is a cross-sectional view illustrating the structure of an optical writing device of the image reading device shown in FIG. 2, according to an example embodiment of the present invention.

Referring now to FIG. 3, an example structure of the optical writing device 2 is explained. The optical writing device 2 includes an exposure glass 1, the first carriage 3 having the light source 7 and a first mirror 3*a*, the second carriage 4 having a second mirror 4*a* and a third mirror 4*b*, an imaging lens 5, and a reference board 8.

Figure 1B:
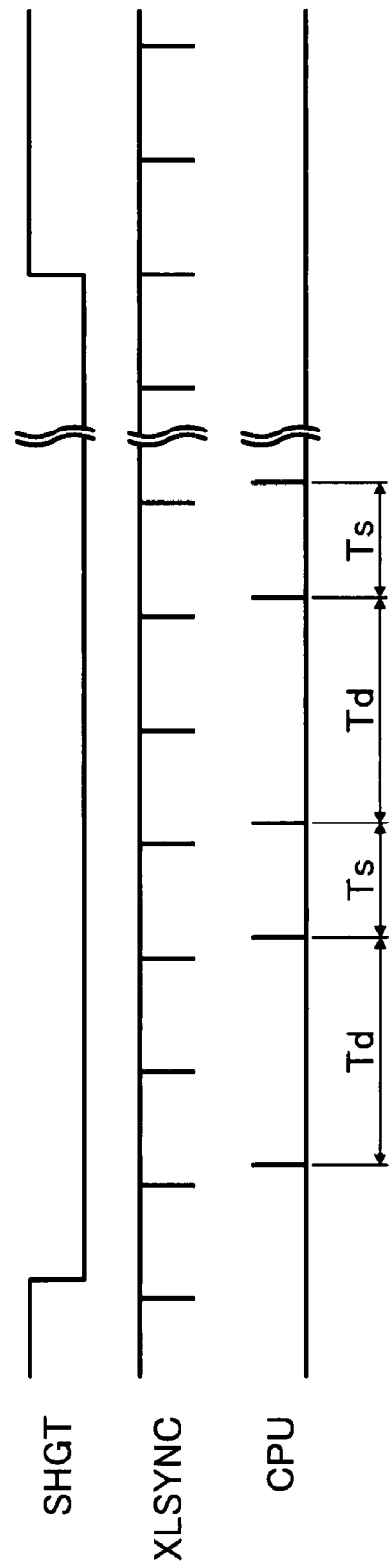
FIG. 1B is a timing chart illustrating gain control operation performed by a controller of the background image reading device shown in FIG. 1A.

In scanning operation, when the original P is placed on the exposure glass 1, the first carriage 3 starts moving in the sub-scanning direction indicated by the arrow to the position indicated by "P3" in FIG. 1 with the speed V. At the same time, the second carriage 4 starts moving in the sub-scanning direction to the position indicated by "P4" in FIG. 1 with the speed half of the speed V, e.g., 2/V. Further, the light source 7, which is provided under the exposure glass 1, irradiates light to the surface of the original P. The light reflected from the surface of the original P is directed by the first mirror 3*a* toward the second mirror 4*a* and the third mirror 4*b*, and further to the imaging lens 5. The imaging lens 5 forms the optical image on the imaging surface of the CCD 6. The CCD 6 converts the optical image, line by line, into the image signal, and outputs the image signal to the image signal processing circuit 10 shown in FIG. 2.

In addition to scanning the original P into the image data, the CCD 6 may obtain a white level value of image data, which may be used for further processing, including gain control operation and/or shading correction. The white level value is obtained by reading the white reference board 8, which is provided at one side of the exposure glass 1.

Figure 4:
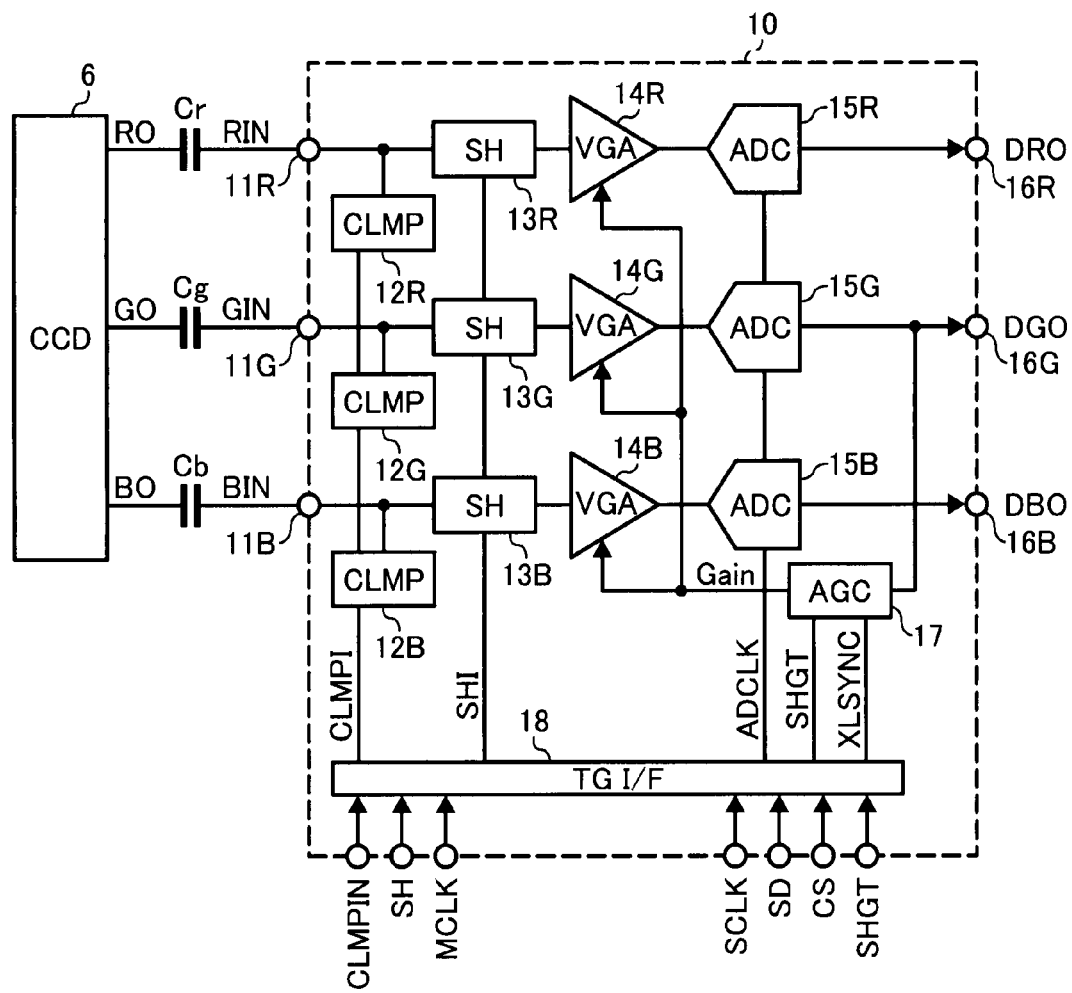
FIG. 4 is a schematic circuit diagram illustrating an image signal processing circuit of the image reading device shown in FIG. 2, according to an example embodiment of the present invention.

Referring now to FIG. 4, the structure of the image signal processing circuit 10 is explained according to an example embodiment of the present invention.

The image signal processing circuit 10, which is an integrated circuit, is coupled to the CCD 6 via capacitors Cr, Cg, and Cb. The capacitors Cr, Cg, and Cb each function as the input alternate current (AC) coupling capacitor. In this example, the CCD 6, which may be implemented by a color linear image sensor, outputs a red image signal component RO, a green image signal component GO, and a blue image signal component BO. The red image signal component RO is input to an input terminal 11R of the image signal processing circuit 10 as a red input signal component RIN. The green image signal component GO is input to an input terminal 11G of the image signal processing circuit 10 as a green input signal component GIN. The blue image signal component BO is input to an input terminal 11B of the image signal processing circuit 10 as a blue input signal component BIN. After applying signal processing, the image signal processing circuit 10 outputs red image data DRO, green image data DGO, and blue image data DBO respectively through output terminals 16R, 16G, and 16B.

Still referring to FIG. 4, the image signal processing circuit 10 includes a first section that processes the red input signal component RIN, a second section that processes the green input signal component GIN, and a third section that processes the blue input signal component BIN. Each section includes a clamp circuit (CLMP) 12, a sample hold circuit (SH) 13, a variable gain amplifier (VGA) 14, and an analog digital converter (ADC) 15. The CLMP 12 determines a reference potential level of the image signal processing circuit 10. The SH 13 samples and holds a specific range of the input signal component RIN, GIN, or BIN. The VGA 14 amplifies the sampled signal with a gain having the value obtained by performing gain control operation. The ADC 15 converts the amplified signal from analog to digital to generate image data.

The image signal processing circuit 10 further includes a timing generator and interface (TG I/F) circuit 18. The TG I/F circuit 18 receives one or more control signals including the clamp signal (CLMPIN) signal, the sample hold (SH) signal, and the main clock (MCLK) signal from an ASIC coupled to the image signal processing circuit 10. The clamp (CLMPIN) signal functions as a gate control signal for respectively controlling the CLMP 12R, 12G, and 12B. When the CLMPIN signal has the high level, the AC capacitors Cr, Cg and Cg are charged. The potential level of the image signal processing circuit 10 is then set to the potential level of the image signal output from the CCD 6. The SH signal is a sample clock signal for respectively controlling the SH 13R, 13G, and 13B. When the SH signal has the high level, the SH 13 samples and holds a specific range of the image signal output from the CCD 6 to output the sampled image signal. The MCLK signal is a reference signal for controlling the image signal processing circuit 10. Based on the MCLK signal, the TG I/F 18 generates the analog digital clock (ADCLK) signal, which is a clock signal for respectively controlling the ADC 15R, 15G, and 15B. For simplicity, the ADCLK signal may be omitted from any one of FIGS. 8, 9, and 10.

The TG I/F circuit 18 additionally receives one or more control signals including the serial clock (SCLK) signal, the serial data (SD) signal, the chip select (CS) signal, and the sample hold gate (SHGT) signal from the scanner controller 63 of FIG. 2. The SCLK signal is a clock signal used for controlling operation of reading from or writing into a register of the image signal processing circuit 10 via a serial interface. The SD signal is write data to be written into the register of the image signal processing circuit 10. The CS signal controls time in which the serial interface is accessed. For example, when the CS signal has the low level, the SCLK signal and the SD signal are input. The SHGT signal is a gate control signal used for controlling timing related to gain control operation, for example, as described below referring to FIG. 5 or 6.

As described below, the TG I/F 18 may receive any desired number or any desired type of control signals from the outside of the image signal processing circuit 10. In one example, in addition to the SD signal, a SDI signal may be input to the TG I/F 18. The SDI signal is read data to be read from the register of the image signal processing circuit 10.

The image signal processing circuit 10 further includes an automatic gain control circuit (AGC) 17. When the SHGT signal having the low level is input from the TG I/F circuit 18 after the input signal components RIN, GIN, and BIN are input, the AGC 17 detects the peak value of the green image data DGO output from the ADC 15G, and adjusts the value of the gain based on the determination result indicating whether the peak value is substantially equal to the target white level value.

Figure 5:
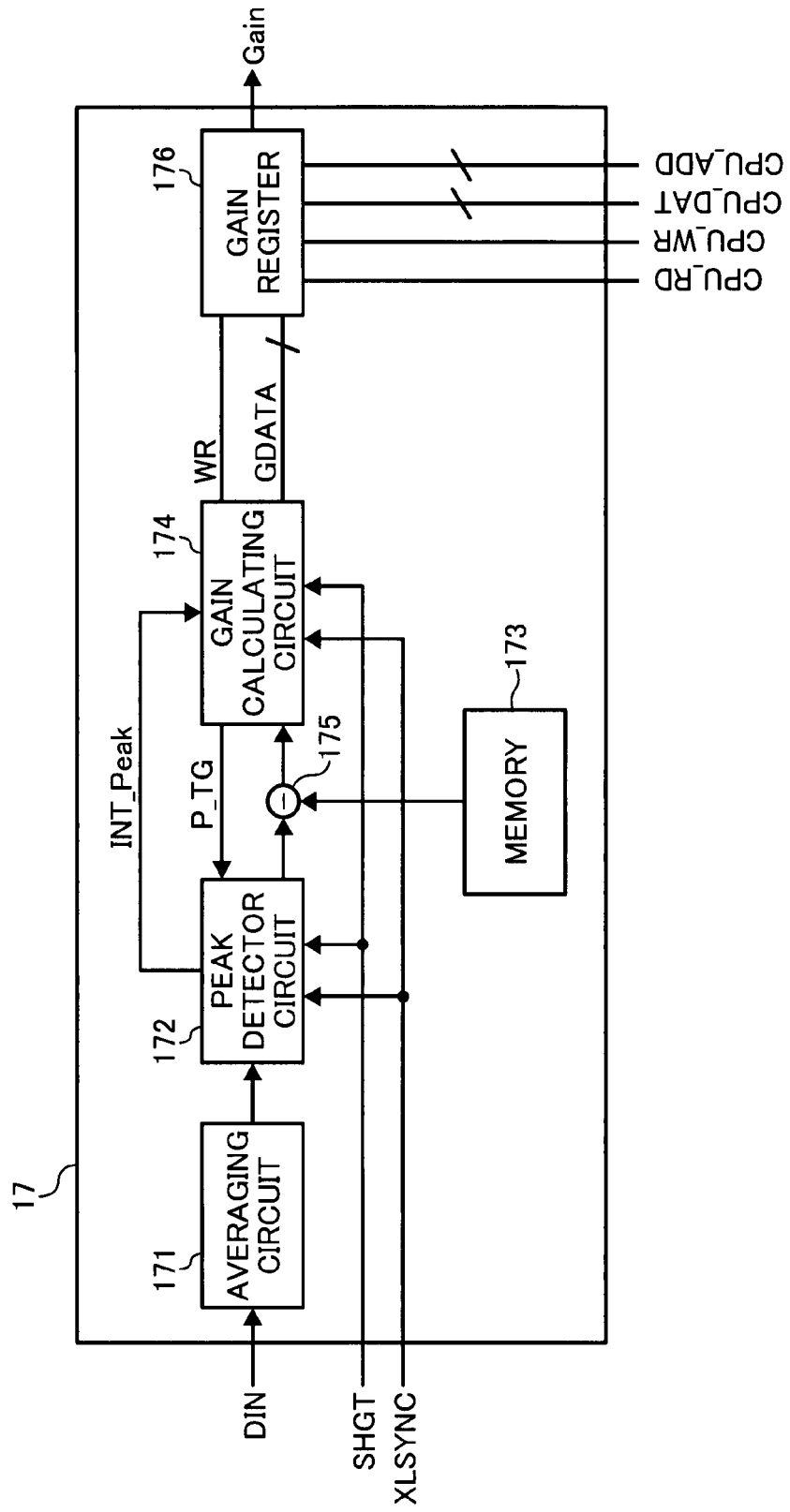
FIG. 5 is a schematic circuit diagram illustrating an automatic gain control circuit of the image signal processing circuit shown in FIG. 4, according to an example embodiment of the present invention.

Referring to FIG. 5, the AGC 17 includes an averaging circuit 171, a peak detector circuit 172, a memory 173, a gain calculating circuit 174, a comparator circuit 175, and a gain register 176.

The averaging circuit 171 inputs one line of the green image data DGO output from the ADC 15G as input data DIN. The averaging circuit 171 removes a noise component from the input data DIN, for example, by averaging the pixels contained in the input data DIN. In this example, the green image data DGO is preferably used since the green image data DGO tends to have the high brightness level. Alternatively, the red image data DRO or the blue image data BRO may be used.

When the SHGT signal having the low level is input from the TG I/F 18, the peak detector circuit 172 detects the peak value of one line of the image data DIN in synchronization with the line synchronization signal XLSYNC input from the TG I/F 18. When the peak value detection is completed, the peak detector circuit 172 notifies the gain calculating circuit 174 that detection is completed by outputting the INT_Peak signal having the H level.

The comparator circuit 175 compares between the peak value detected by the peak detector circuit 172 and the target white level value, which is stored in the memory 173, to output a comparison result. For example, the comparator circuit 175 may obtain the difference between the peak value and the target white level value, and output the difference as the comparison result.

When the comparison result indicates that the peak value is not substantially equal to the target white level value, the gain calculating circuit 174 calculates the gain based on the difference between the peak value and the target white level value to generate gain data GDATA, and sends the gain data GDATA to the gain register 176. The gain stored in the gain register 176 may be used by the VGA 14R, 14G, or 14B when amplifying the image signal. The gain calculating circuit 174 then outputs the P_TG signal having the high level to the peak detector circuit 17 to notify that the gain calculation is completed. Upon receiving the P_TG signal having the high level, the peak detector circuit 17 starts detecting the peak value of the next line of the input data DIN.

As described below, the image reading device 60 may incorporate an image signal processing circuit having the structure different from the structure shown in FIG. 4. In one example, the VGA 14 of FIG. 4 may be replaced by a digital amplifier, which may be provided between the ADC 15 and the output terminal 16. Further, the AGC 17 is coupled to the digital amplifier. In such case, the ADC 15 converts the image signal received from the SH 13 from analog to digital to output the image data to the digital amplifier. The digital amplifier amplifies the image data with a multiplier coefficient. The multiplier coefficient is controlled by the ADC 17 in a substantially similar manner as described above referring to FIG. 5. In another example, the digital amplifier may be provided in addition to the VGA 14 of FIG. 4.

In another example, the logic level of the control signal may be set differently. For example, any one of the above-described logic level used by the image signal processing circuit 10 may be reversed as long as the image signal processing circuit 10 functions in a substantially similar manner as described above referring to FIG. 4 or 5.

Figure 6:
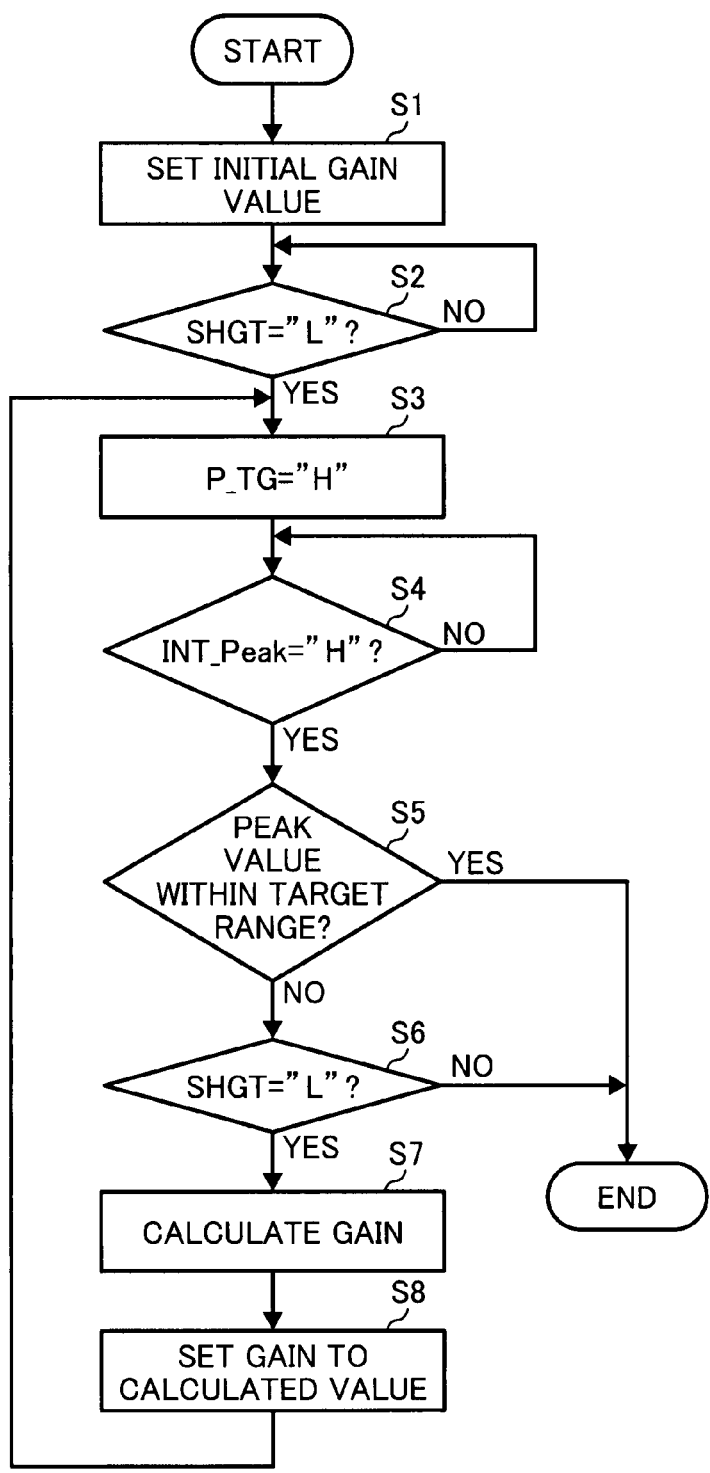
FIG. 6 is a flowchart illustrating gain control operation, performed by the automatic gain control circuit shown in FIG. 5, according to an example embodiment of the present invention.

Referring now to FIG. 6, gain control operation, performed by the AGC 17 of FIG. 5, is explained according to an example embodiment of the present invention. The operation of FIG. 6 may be performed by the gain calculating circuit 174 when the power of the image reading device 60 is turned on or when the target white level value is changed due to the change in amount of light irradiated from the light source 7.

S1 sets the initial value of gain respectively for the VGA 14R, 14G, and 14B. In one example, the initial value may be set to a predetermined value. In another example, the initial value may be set to the value of gain previously obtained by the AGC 17 by performing gain control operation. The initial value may be read out from the gain register 176.

S2 determines whether the SHGT signal has the low level. When the SHGT signal has the low level ("YES" at S2), the operation proceeds to S3. When the SHGT signal has the high level ("NO" at S2), the operation repeats S2.

S3 causes the peak detector circuit 172 to start operation of detecting the peak value of the input data DIN. Specifically, the gain calculating circuit 174 outputs the P_TG signal having the high level, which is previously set to the low level.

S4 determines whether the peak value detection, performed by the peak detector circuit 172, is completed, for example, by determining whether the INT_Peak signal output from the peak detector circuit 172 becomes the high level. When the INT_Peak signal has the high level ("YES" at S4), the operation proceeds to S5.

When the INT_Peak signal has the low level ("NO" at S4), the operation repeats S4. S5 determines whether the peak value detected by the peak detector circuit 172 falls within a target range previously determined based on the target white level value stored in the memory 173. For example, the gain calculating circuit 174 may receive the comparison result from the comparator circuit 175, which indicates the difference between the peak value and the target white level value. When the difference is less than a predetermined value ("YES" at S5), the gain calculating circuit 174 determines that the peak value falls within the target range, and the operation ends. When the difference is equal to or greater than the predetermined value ("NO" at S5), the gain calculating circuit 174 determines that the peak value does not fall within the target range, and the operation proceeds to S6.

S6 determines whether the SHGT signal has the low level. When the SHGT signal has the low level ("YES" at S6), the operation proceeds to S7. When the SHGT signal has the high level ("NO" at S6), the operation ends.

S7 calculates the value of gain using the difference between the detected peak value and the target white level value. Specifically, in this example, the value of gain is obtained by adding or subtracting the difference to or from the initial gain value set at S1.

S8 sets the current value of gain to the calculated gain value, and the operation ends. In this example, the gain calculating circuit 174 instructs the gain register 176 to write the calculated gain value as gain data GDATA by activating a write signal WR. The VGA 14R, 14G, or 14B uses the gain data GDATA when amplifying the image signal.

The above-described steps S3 to S8 may be repeated until the peak value of one line of the image data DGO becomes equal to the target white level value.

Since the gain control operation may be performed by the AGC 17, which is incorporated in the image signal processing circuit 10, work load of the scanner controller 63 or work required for designing the software program used by the scanner controller 63 may be reduced. Further, since the execution of the software program is not necessary, the AGC 17 may be able to start gain control operation at the same time when the image reading device 60 or an image forming apparatus incorporating the image reading device 60 is turned on, without waiting for the scanner controller 63 to be executed.

Figure 7:
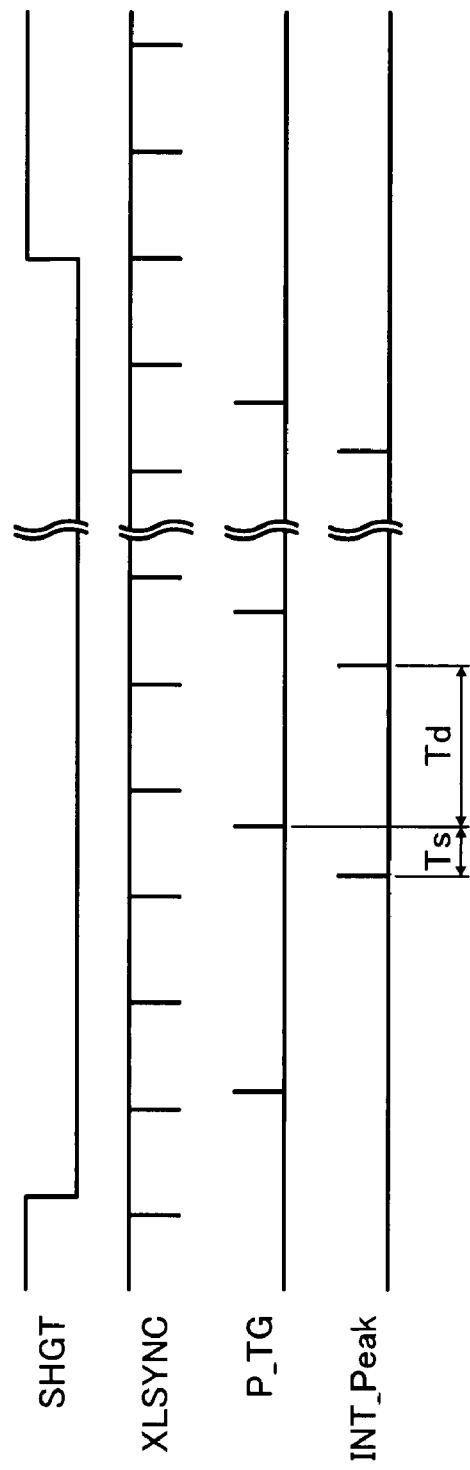
FIG. 7 is a timing chart illustrating gain control operation performed by the automatic gain control circuit shown in FIG. 5, according to an example embodiment of the present invention.

Further, as illustrated in FIG. 7, since the AGC 17 is notified when the peak value detection is started and when the peak value detection is completed, it is not necessary to wait for a predetermined time period to make sure that the peak value detection is completed. This may reduce the time required for performing the gain control operation, and the time required for starting up the image reading device 60 or an image forming apparatus incorporating the image reading device 60.

Further, as data exchange between the image signal processing circuit 10 and the scanner controller 63 through the cable, such as the harness, is reduced, reliability of the gain control operation may increase, thus improving the image quality. Further, incorporating the AGC 17 in the image signal processing circuit 10, which is an integrated circuit, may reduce the overall size of the image reading device.

Referring to FIG. 7, the gain calculating circuit 174 receives the SHGT signal having the low level from the scanner controller 63 in synchronization with the line synchronization signal XLSYNC. The gain calculating circuit 174 outputs the P_TG signal having the high level in synchronization with the line synchronization signal XLSYNC to cause the peak detector circuit 172 to start the peak value detection. When the peak value detection is completed, the gain calculating circuit 174 receives the INT_PEAK signal having the high level in synchronization with the line synchronization signal XLSYNC. In this manner, a time period Td in which the peak value is detected may be controlled by a gate control signal, such as the SHGT signal, output from the TG I/F 28. Alternatively, the time period Td may be controlled by a register control signal, for example, as described below referring to any one of FIGS. 14A to 14D. The time period Td of FIG. 7 is made smaller than the time period Td illustrated in the example case of FIG. 1B.

The gain control operation shown in FIG. 5 or 6 may be performed in various other ways. In one example, instead of detecting the peak value of the image data, the average value or the minimum value of the image data may be obtained. In such case, the target white level value may correspond to the average value or the minimum value of the image data obtained by reading the white reference board 8 (FIG. 3). In another example, the target white level value may be adjusted, for example, through a control signal received from the outside.

In another example, the TG I/F 18 may change the gain data GDATA, which is stored in the gain register 176, according to the control signal output by the scanner controller 63, such as the SCLK signal, SD signal, or CS signal. Such signal may be input to the TG I/F 18 of the image signal processing circuit 10 via the internal data bus or address bus through the serial interface. Further, the gain data GDATA may be read out from the outside. For example, referring back to FIG. 5, the gain register 176 may read the gain data GDATA or write the gain data GDATA, according to the CPU_RD signal, CPU_WR signal, CPU_DAT signal, or CPU_ADD signal received from the scanner controller 63. In this manner, the gain of the VGR 14R, 14G, or 14B may be controlled from the outside of the image signal processing circuit 10.

In another example, as described above referring to FIG. 4, the VGA 14 may be replaced by a digital amplifier, which amplifies the image data converted from the image signal with a multiplier coefficient. In such case, the ADC 17 controls the multiplier coefficient in a substantially similar manner as described above referring to FIG. 6. In another example, the digital amplifier may be provided in addition to the VGA 14. In another example, the logic level of the control signal may be set differently as described above referring to FIG. 4.

Figure 8:
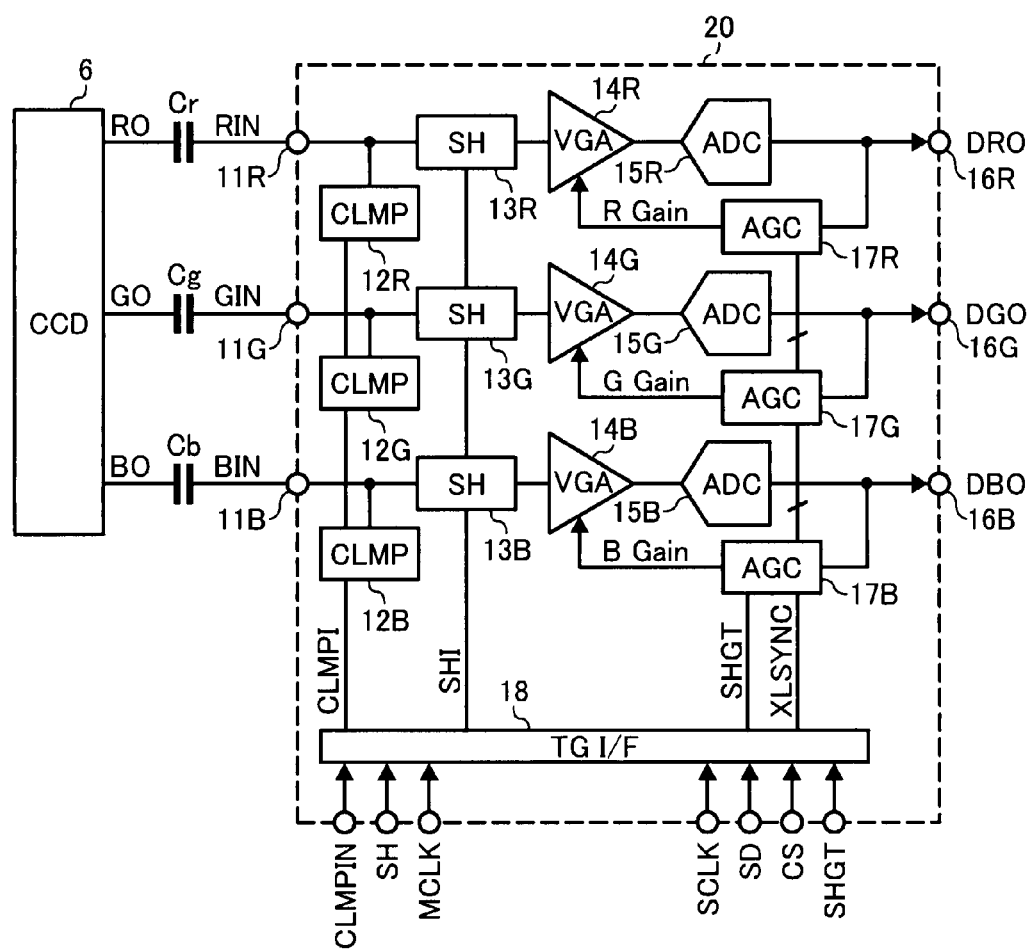
FIG. 8 is a schematic circuit diagram illustrating an image signal processing circuit of the image reading device shown in FIG. 2, according to an example embodiment of the present invention.

Referring to FIG. 8, the structure of an image signal processing circuit 20 is explained according to an example embodiment of the present invention. The image signal processing circuit 20 is substantially similar in structure to the image signal processing circuit 10 of FIG. 4. The differences include the replacement of the AGC 17 with an AGC 17R, AGC 17G, and AGC 17B. The AGC 17R, 17G, and 17B, each of which having the structure shown in FIG. 5, operates in a substantially similar manner as described above referring to FIG. 5 or 6. Specifically, the AGC 17R controls the value of gain data RGain, which is input to the VGA 14R, using the image data DRO. The AGC 17G controls the value of gain data GGain, which is input to the VGA 14G, using the image data DGO. The AGC 17B controls the value of gain data BGain, which is input to the VGA 14B, using the image data DBO. By providing the AGC 17 for each one of the image signal components, gain control operation may be performed independently for each one of the image signal components. In this manner, the value of the gain may be obtained with the improved accuracy.

Figure 9:
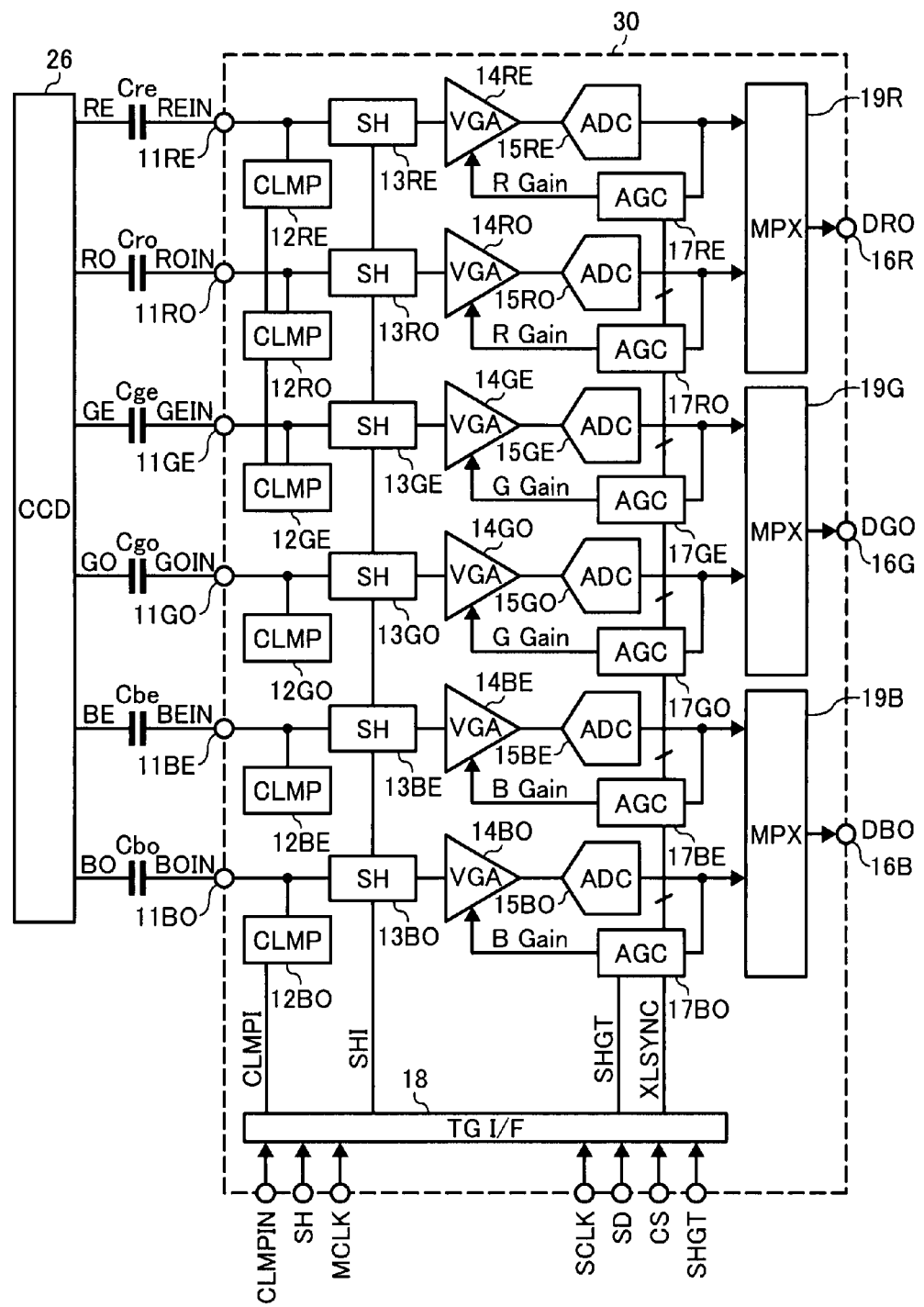
FIG. 9 is a schematic circuit diagram illustrating an image signal processing circuit of the image reading device shown in FIG. 2, according to an example embodiment of the present invention.

Referring to FIG. 9, the structure of an image signal processing circuit 30 is explained according to an example embodiment of the present invention. The image signal processing circuit 30 is substantially similar in structure to the image signal processing circuit 10 of FIG. 4 or the image signal processing circuit 20 of FIG. 8. The differences include the replacement of the CCD 6 with a CCD 26, and the addition of multiplex circuits (MPX) 19. As illustrated in FIG. 9, the CCD 26 outputs two image signal components respectively for the colors of red, green, and blue. Accordingly, the number of AC capacitors and the number of sections in the image signal processing circuit 30 are changed. Specifically, the AC capacitors Cre, Cro, Cge, Cgo, Cbe, and Cbo are coupled to the image signal processing circuit 30. The image signal processing circuit 30 includes six sections, each section processing the corresponding one of the image signal components. Each section may include the CLMP 12, SH 13, VGA 13, ADC 15, and AGC 17, as described above referring to FIG. 4.

The CCD 26 outputs red image signal components RE and RO, green image signal components GE and GO, and blue image signal components BE and BO. The image signal components RE, RO, GE, GO, BE, and BO are respectively input to the image signal processing circuit 30 through input terminals 11RE, 11RO, 11GE, 11GO, 11BE, and 11BO as input image signal components REIN, ROIN, GEIN, GOIN, BEIN, and BOIN. The image signal component RE and the image signal component RO, each of which is processed by the corresponding section of the image signal processing circuit 30, are combined by the MPX 19R into red image data DRO. The image signal component GE and image signal component GO, each of which is processed by the corresponding section of the image signal processing circuit 30, are combined by the MPX 19G into green image data DGO. The image signal component BE and the image signal component GO, each of which is processed by the corresponding section of the image signal processing circuit 30, are combined by the MPX 19B into blue image data DBO. The image data DRO, RGO, and DBO are respectively output through output terminals 16R, 16B, and 16B. In a substantially similar manner as described above referring to FIG. 8, the AGC 17 is provided for each one of the image signal components such that gain control operation may be performed independently for each one of the image signal components. Alternatively, in a substantially similar manner as described above referring to FIG. 4, the number of the AGC 17 may be limited to one. Alternatively, three AGC 17 may be provided in a corresponding manner with the colors of red, green, and blue.

Figure 10:
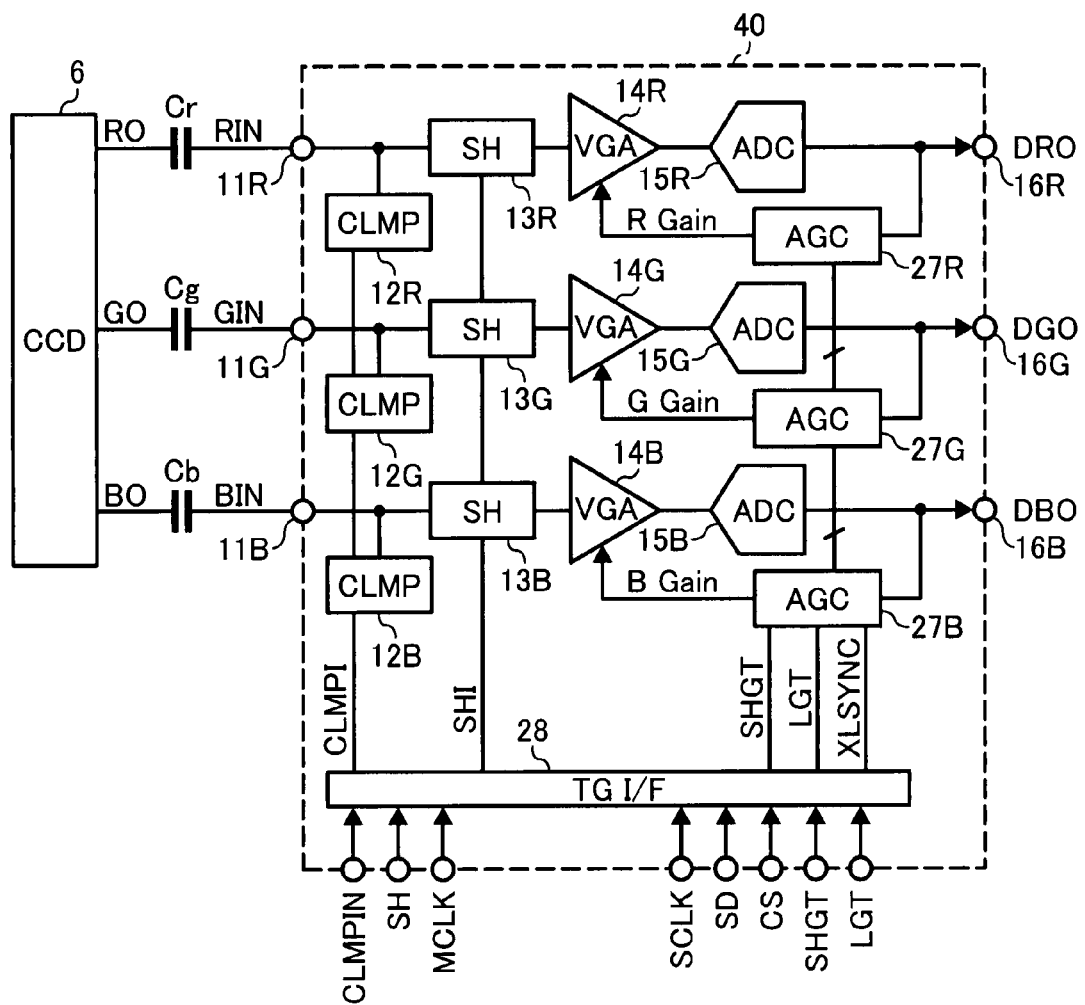
FIG. 10 is a schematic circuit diagram illustrating an image signal processing circuit of the image reading device shown in FIG. 2, according to an example embodiment of the present invention.

Referring to FIG. 10, the structure of an image signal processing circuit 40 is explained according to an example embodiment of the present invention. The image signal processing circuit 40 is substantially similar in structure to the image signal processing circuit 20 of FIG. 8. The differences include the replacement of the AGC 17 with an AGC 27 shown in FIG. 11. Further, in this example, the TG I/F 28 outputs an LGT signal to the AGC 27 in addition to the SHGT signal and the XLSYNC signal. The LGT signal is a gate control signal indicating an effective image area in the main scanning direction as illustrated in FIG. 12.

Figure 11:
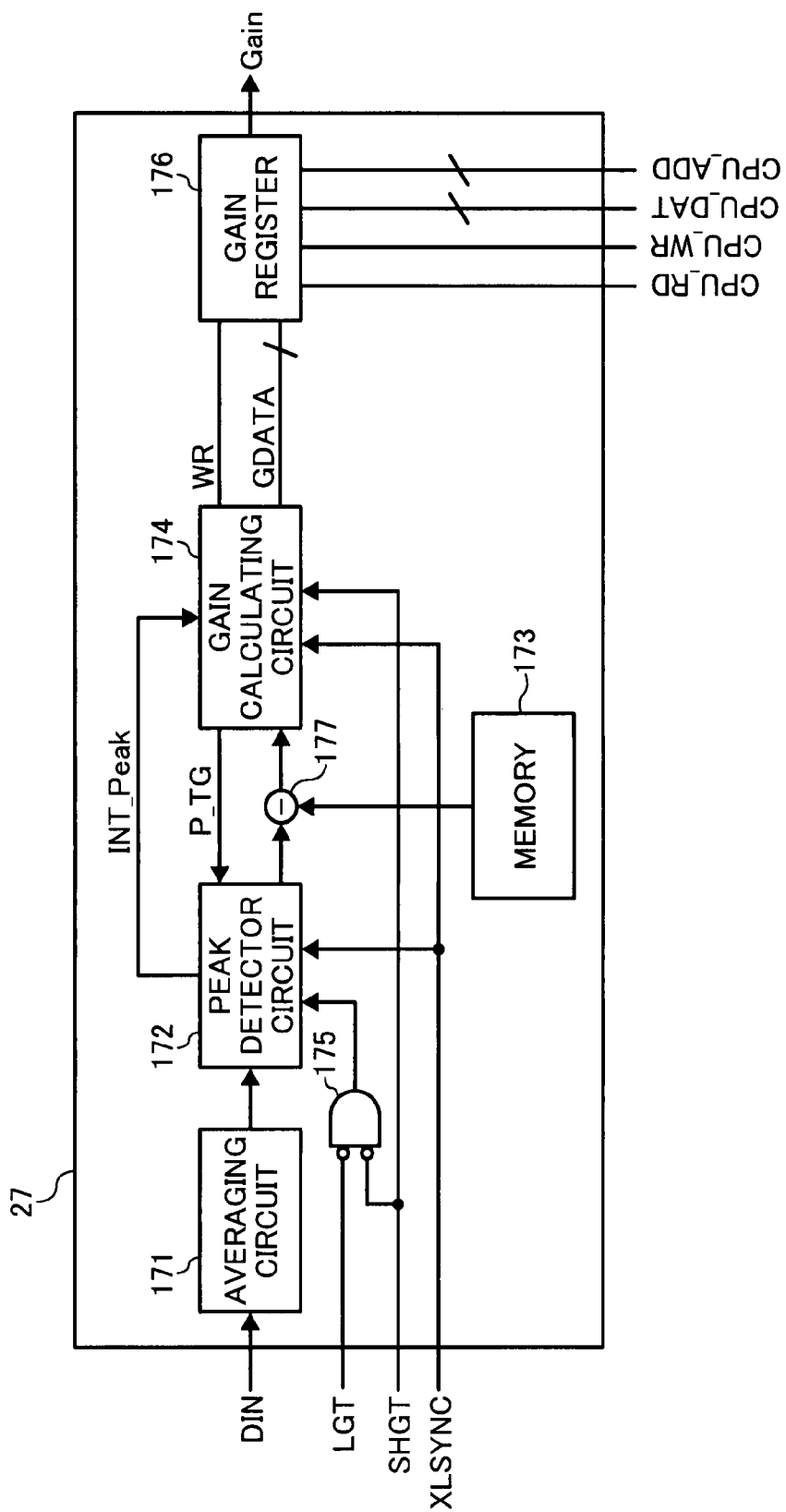
FIG. 11 is a schematic circuit diagram illustrating an automatic gain control circuit shown in FIG. 10, according to an example embodiment of the present invention.
Figure 12:
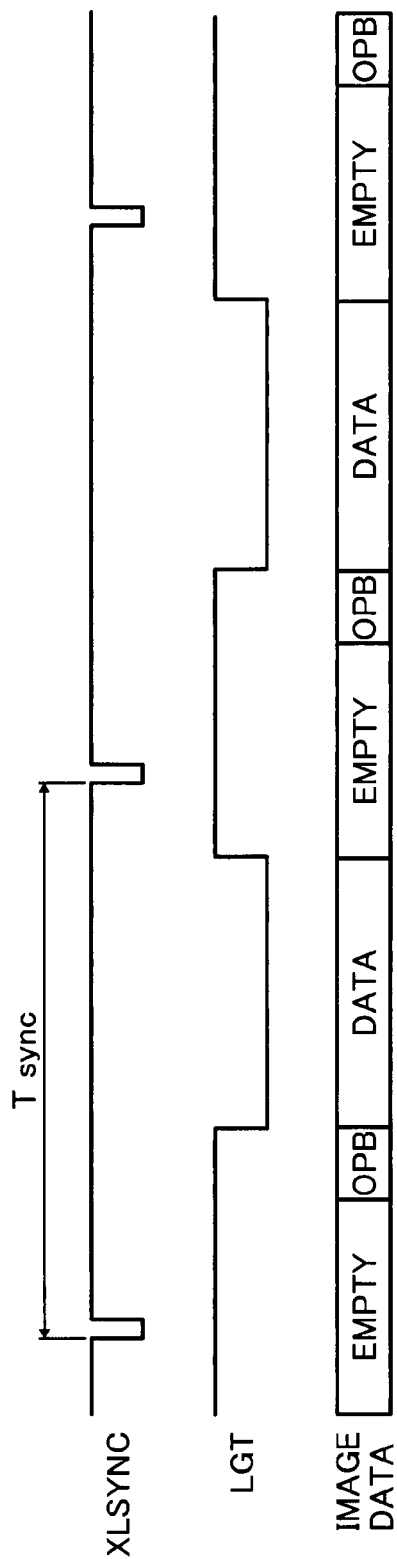
FIG. 12 is a timing chart illustrating timing for starting peak value detection, according to an example embodiment of the present invention.

Referring to FIG. 11, the AGC 27 is substantially similar in structure to the AGC 17 of FIG. 5. The differences include the addition of an AND circuit 175. In operation, when the SHGT signal having the low level and the LGT signal having the low level are input to the AND circuit 175, the AND circuit 175 outputs the high level signal to the peak detector circuit 172 to cause the peak detector circuit 172 to detect the peak value of the image data DIN. For example, referring to FIG. 12, when the image data is output from the CCD 6, the LGT signal having the low level is output to cause the peak detector circuit 172 to detect the peak value of the image data. In this manner, the peak value detection may be controlled by a gate control signal provided from the outside such that the peak value detection is performed for the effective image area.

Alternatively, in a substantially manner as described above referring to any one of FIGS. 4 to 6, the peak value detection may be controlled by a register control signal. Accordingly, the image signal processing circuit 40 is capable of operating in various ways.

The image signal processing circuit 40 of FIG. 10 may be implemented in various other ways. For example, the image signal processing circuit 40 of FIG. 10 may have the structure substantially similar to the structure of any one of the image signal processing circuits 10 and 30, as long as the AGC 17 is replaced with the AGC 27.

Figure 13:
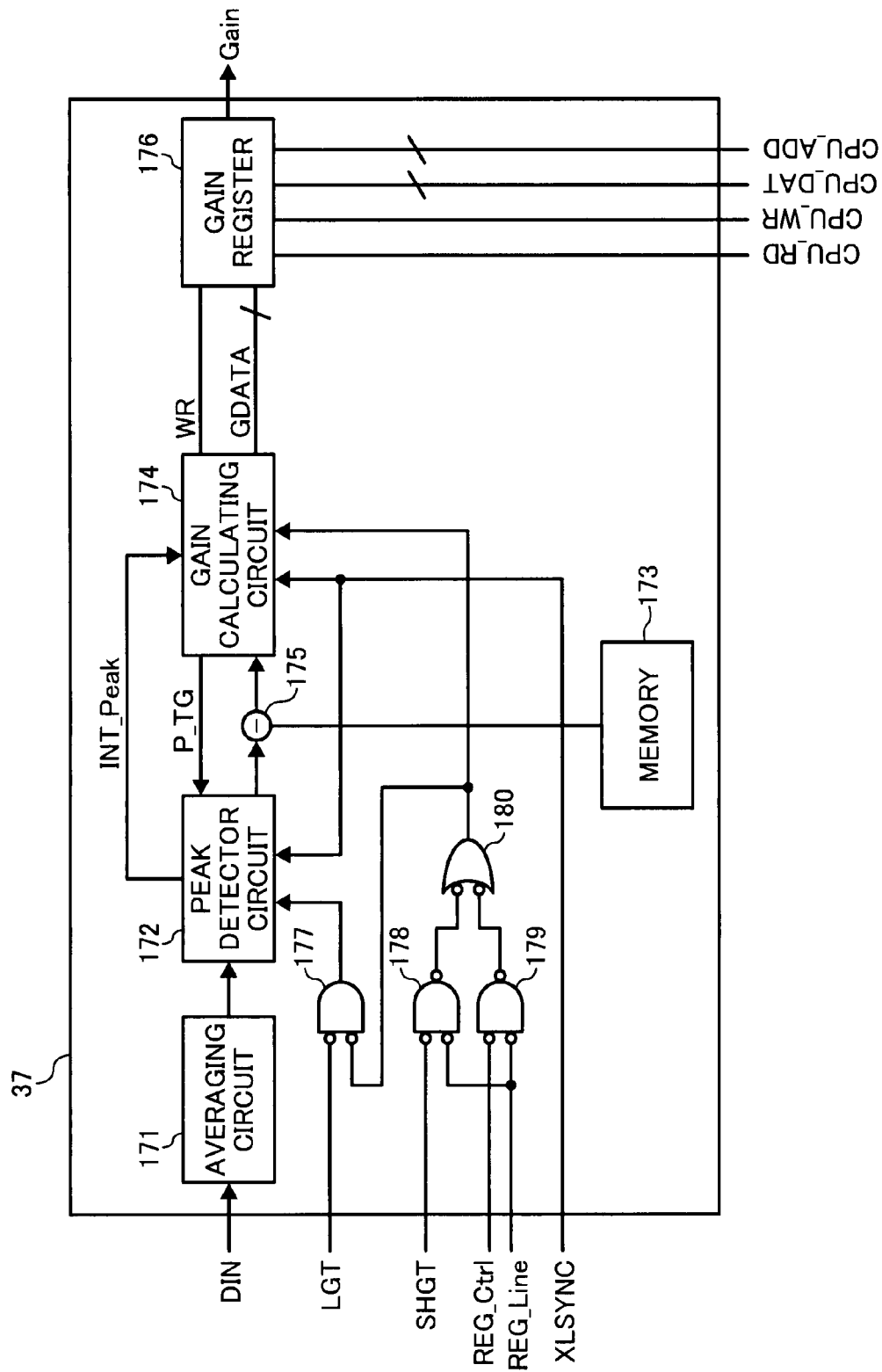
FIG. 13 is a schematic circuit diagram illustrating an automatic gain control circuit, according to an example embodiment of the present invention.

Referring to FIG. 13, the structure of an automatic gain control circuit (AGC) 37, which may be incorporated in an image signal processing circuit, is explained according to an example embodiment of the present invention. The image signal processing circuit of this example may be substantially similar in structure to any one of the image signal processing circuits 10, 20, 30, and 40, except for the replacement of the AGC 17 (FIG. 5) or AGC 27 (FIG. 11) with the AGC 37. For the descriptive purpose, FIG. 13 illustrates the example case in which the AGC 37 is incorporated in the image signal processing circuit 40.

The AGC 37 is substantially similar in structure to the AGC 27 shown in FIG. 11, except for the addition of NAND circuits 178 and 179, and an OR circuit 180. The NAND circuit 178 inputs the SHGT signal and a REG_Line signal, which are respectively output from the TG I/F 28 (FIG. 10). The NAND circuit 179 inputs the REG_Ctrl signal and the REG_line signal, which are respectively output from the TG I/F 28. The OR circuit 180 inputs the signal output from the NAND circuit 178 and the signal output from the NAND circuit 179, and outputs the resultant control signal to the gain calculating circuit 174. The AND circuit 177 inputs the LGT signal output from the TG I/F 28 and the signal output from the OR circuit 180, and outputs the resultant control signal to the peak detector circuit 172.

The REG_Ctrl signal is a register control signal that controls the on or off state of the AGC 37 when activated. In this example, when the REG_Ctrl signal has the low level, the AGC 37 is controlled by the register control signal, such as the REG_Ctrl signal. When the REG_Ctrl signal has the high level, the AGC 37 is controlled by the gate control signal, such as the SHGT signal.

The REG_Line signal is a line control signal that controls the number of lines of image data to which the gain control operation is applied by the AGC 37. In this example, when the SHGT signal having the low level is output or the REG_Ctrl signal having the low level is output, the REG_Line signal is switched from the high level to the low level to start gain control operation. At the same time, the number of lines of image data DIN is counted to generate a counted line number. When the counted line number reaches a predetermined line number, the REG_Line signal is switched from the low level to the high level to end gain control operation. The predetermined number of lines of image data may be set through the register.

For example, referring to FIGS. 14A and 14C, when the SHGT signal having the low level is output and the REG_Ctrl signal having the high level is output, the AGC 37 is controlled by the SHGT signal. Referring to FIG. 14A, when the REG_Line signal having the low level is continuously output, the AGC 37 performs gain control operation during a time period Tg, which may be specified by the level of the SHGT signal. Referring to FIG. 14C, when the REG_Line signal having the low level is output for a predetermined time period, the AGC 37 performs gain control operation during a time period Tg, which may be specified by the level of the SHGT signal and the level of the REG_Line signal.

In another example, referring to FIGS. 14B and 14D, when the SHGT signal having the high level is output and the REG_Ctrl signal having the low level is output, the AGC 37 is controlled by the REG_Ctrl signal. Referring to FIG. 14B, when the REG_Line signal having the low level is continuously output, the AGC 37 performs gain control operation during a time period Tg, which may be specified by the level of REG_Ctrl signal. Referring to FIG. 14D, when the REG_Line signal having the low level is output for a predetermine time period, the AGC 37 performs gain control operation during a time period Tg,l which may be specified by the level of the REG_Ctrl signal and the level of the REG_Line signal.

In this manner, the AGC 37 of FIG. 13 may be controlled in various ways such that it may be applicable to a variety of image reading devices or image reading systems.

Figure 15:
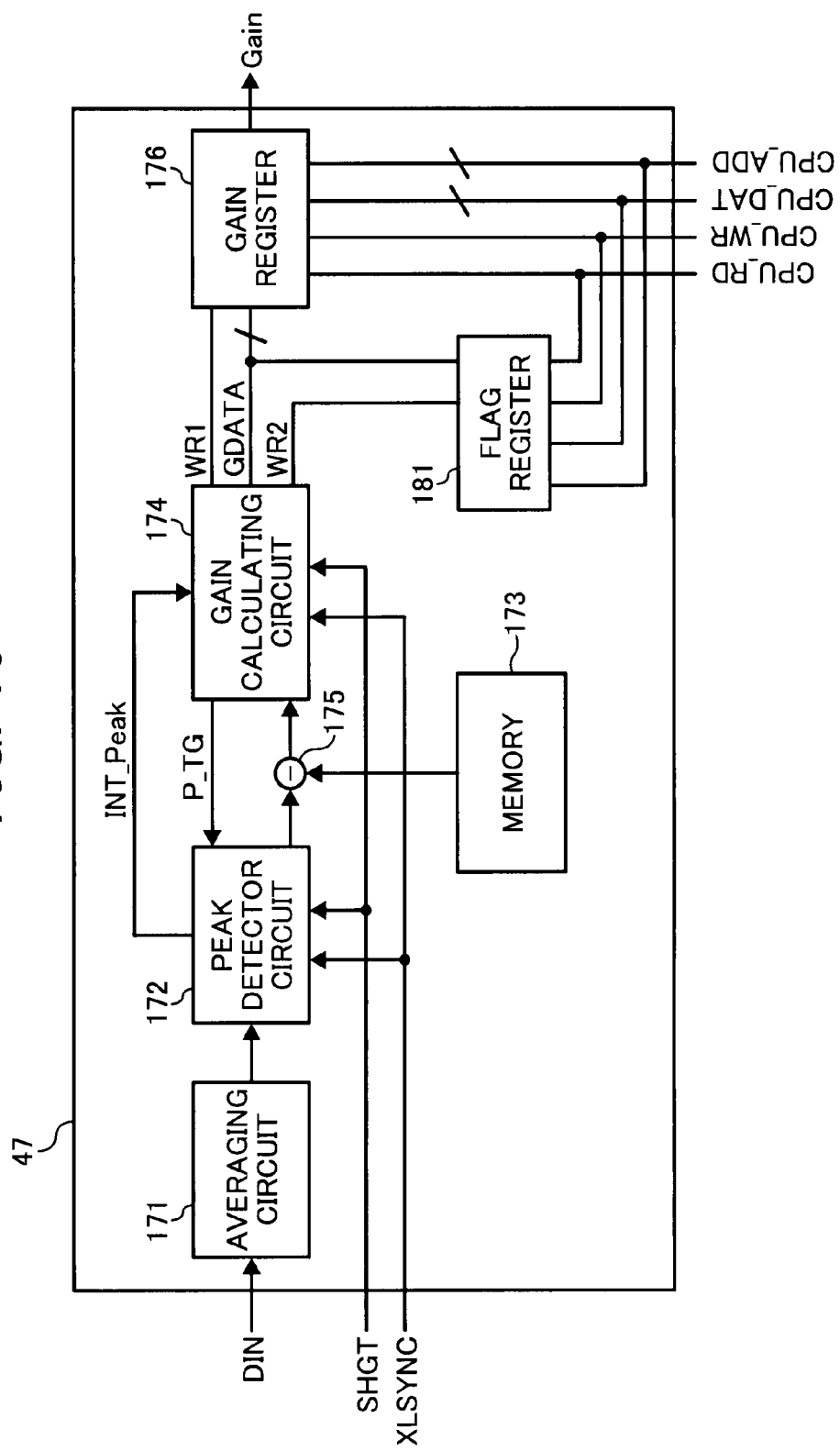
FIG. 15 is a schematic circuit diagram illustrating an automatic gain control circuit, according to an example embodiment of the present invention.

Referring to FIG. 15, the structure of an automatic gain control circuit 47, which may be incorporated in an image signal processing circuit, is explained according to an example embodiment of the present invention. The image signal processing circuit of this example is substantially similar in structure to the image signal processing circuit 10 of FIG. 4 or the image signal processing circuit 20 of FIG. 8 except for the addition of the AGC 47 shown in FIG. 15. The AGC 47 is substantially similar in structure to the AGC 17 shown in FIG. 5, except for the addition of a flag register 181.

Referring to FIG. 15, the flag register 181 is written by the gain calculating circuit 174. For example, when the peak value detected by the peak detector circuit 172 is substantially equal to the target white level value, the gain calculating circuit 174 activates a write signal WR2, and outputs the signal having the value "1" to a GDATA bus. Accordingly, the flag register 181 writes flag data corresponding to the value "1". When the peak value detected by the peak detector circuit 172 is not equal to the target white level value, the gain calculating circuit 174 activates the write signal WR2, and outputs the signal having the value "0" to the GDATA bus. Accordingly, the flag register 181 writes flag data corresponding to the value "0".

The flag data, the value "0" or "1", stored in the flag register 181 may be read out from the scanner controller 63 through serial communication using, for example, the SCLK signal, SD signal, or CS signal. Since the result of the gain control operation may be checked through the register, the gain control operation may be controlled more easily.

Figure 16:
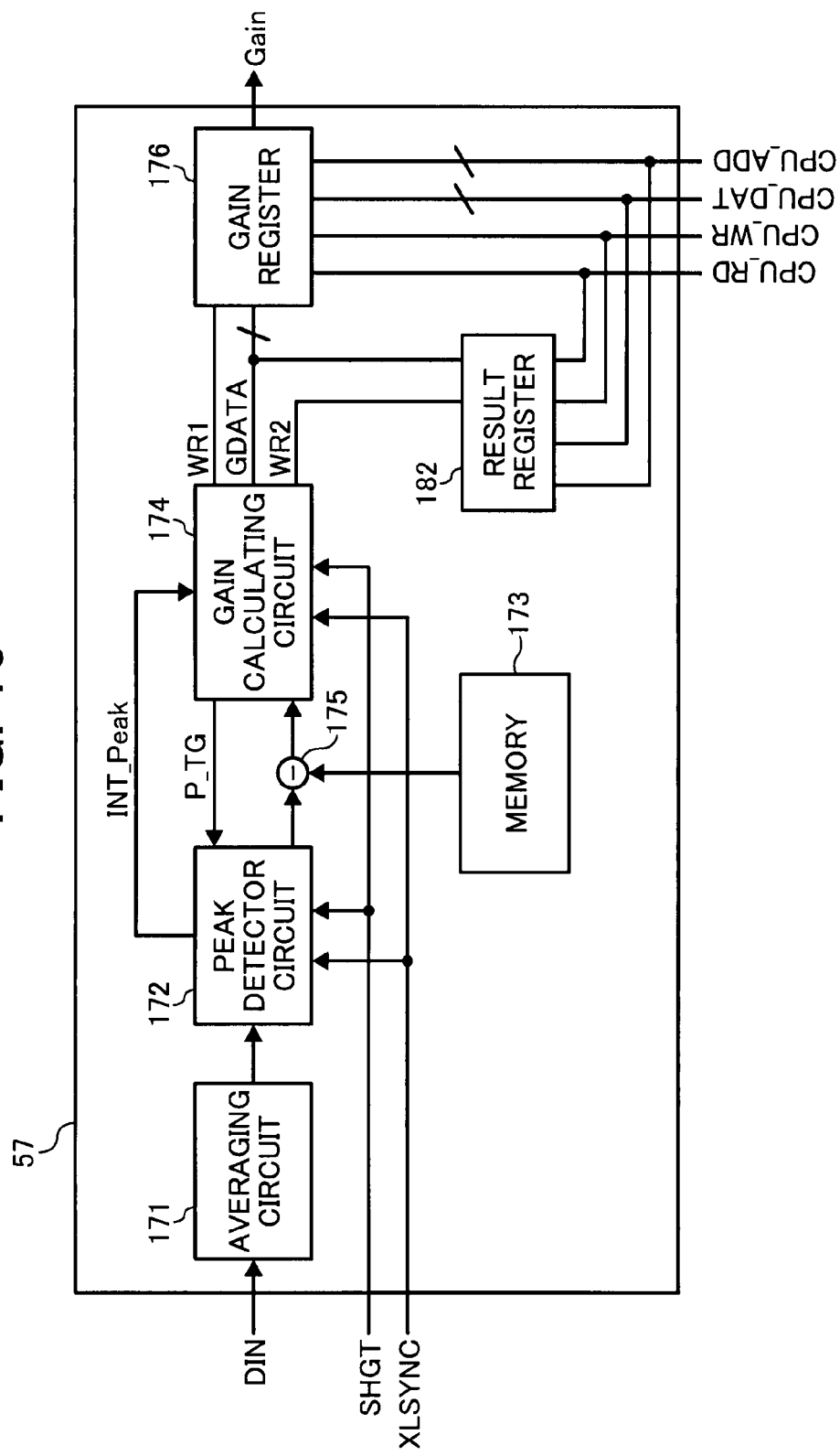
FIG. 16 is a schematic circuit diagram illustrating an automatic gain control circuit, according to an example embodiment of the present invention.

Referring to FIG. 16, the structure of an automatic gain control circuit 57, which may be incorporated in an image signal processing circuit, is explained according to an example embodiment of the present invention. The image signal processing circuit of this example is substantially similar in structure to the image signal processing circuit 10 of FIG. 4 or the image signal processing circuit 20 of FIG. 8, except for the addition of the AGC 57 shown in FIG. 16. The AGC 57 is substantially similar in structure to the AGC 17, except for the addition of a result register 182.

The result register 182 stores information indicating the result obtained by performing the gain control operation, such as the adjusted peak value of the image signal. When the gain control operation is completed, the gain calculating circuit 174 activates the write signal WR2, and outputs the signal indicating the result of the gain control operation to the GDATA bus. Accordingly, the result register 182 writes result data indicating the result of the gain control operation.

The result data stored in the result register 182 may be read out from the scanner controller 63 through serial communication using, for example, the SCLK signal, SD signal, or CS signal. Since the result of the gain control operation may be checked through the register, the gain control operation may be controlled more easily.

The AGC 57 may be implanted in various other ways. For example, the AGC 57 of FIG. 16 may be additionally provided with the flag register 181 shown in FIG. 15.

Figure 17:
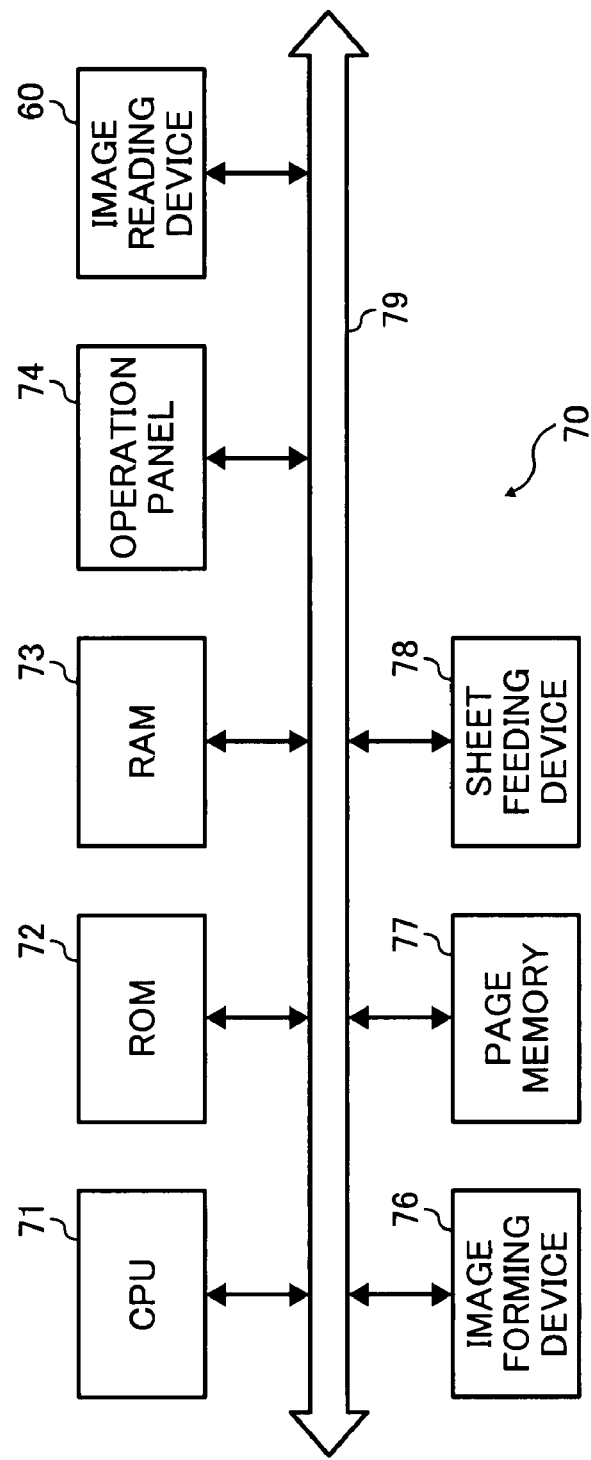
FIG. 17 is a schematic block diagram illustrating the structure of an image forming apparatus incorporating the image reading device shown in FIG. 2, according to an example embodiment of the present invention.

Referring to FIG. 17, the structure of an image forming apparatus 70 is explained according to an example embodiment of the present invention. The image forming apparatus 70 may be implemented by any desired image forming apparatus, including, for example, a printer, copier, facsimile, or multifunctional apparatus having at least two of the functions of printing, copying, and faxing. The image forming apparatus 70 includes a central processing unit (CPU) 71, a read only memory (ROM) 72, a random access memory (RAM) 73, an operation panel 74, the image reading deice 60, an image forming device 76, a page memory 77, and a sheet feeding device 78, which are connected via an internal bus 79. In addition to the elements shown in FIG. 17, the image forming apparatus 70 may include a communication device that allows the image forming apparatus 70 to communicate with the other apparatus via a network.

The CPU 71 controls operation of the image forming apparatus 70. The ROM 72 stores various computer programs to be executed by the CPU 71. The RAM 73 stores various data such as parameters used by the CPU 71, and functions as a work memory of the CPU 71. The operation panel 74 includes a display, such as a liquid crystal display (LCD), which displays various information. The operation panel 74 further includes an input device, such as a keyboard or a touch panel. The image reading device 60 has at least one of the image signal processing circuits 10, 20, 30, and 40, each of which may include at least one AGC selected from the AGC 17, 27, 37, 47, and 57, described above. The image forming device 76 may function as a plotter, such as a laser printer or ink jet printer, capable of forming an image according to the scanned data stored in the page memory 77. The sheet feeding device 78, which may include a sheet tray, feeding roller, or transfer device, feeds a recording sheet to the image forming device 76 to which the image is formed.

Having the image reading device 60, the image forming apparatus 70 is capable of performing gain control operation while the scanner controller 63 of the image reading device 60 or the CPU 71 is started, thus reducing the time required for starting up the image forming apparatus 70.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

The invention claimed is:

1. An image signal processing circuit, comprising:
   an input terminal configured to input an image signal obtained by optically reading image information contained in an original;
   a sample hold circuit coupled to the input terminal and configured to sample and hold a specified range of the image signal to output a sampled image signal;
   a variable gain amplifier coupled to the sample hold circuit and configured to amplify the sampled image signal with a gain to output an amplified image signal;
   an analog digital converter coupled to the variable gain amplifier and configured to convert the amplified image signal to image data; and
   a gain control circuit coupled to the analog digital converter and the variable gain amplifier and configured to control the gain of the variable gain amplifier based on the image data, the gain control circuit comprising:
      a signal level detector configured to detect a signal level of the image data output from the analog digital converter; and
      a gain calculating circuit configured to determine whether the detected signal level is substantially equal to a target level to generate a determination result, obtain an adjusted value of the gain of the variable gain amplifier based on the determination result, and sets the gain of the variable gain amplifier equal to the adjusted value such that the signal level of the image data is made substantially equal to the target level.

2. The circuit of claim 1, wherein the gain control circuit further comprises:
   a gain register configured to store the adjusted value of the gain.

3. The circuit of claim 2, wherein the adjusted value of the gain stored in the gain register is adjusted according to a control signal received from the outside.

4. The circuit of claim 2, wherein timing at which the signal level detector starts detecting the signal level of the image data is controlled by a selected one of:
   a gate control signal input to the gain calculating circuit from the outside in synchronization with a line synchronization signal; and
   a register control signal input to the gain calculating circuit from the outside in synchronization with the line synchronization signal.

5. The circuit of claim 4, wherein the gate control signal specifies a range corresponding to an image effective area of the image signal.

6. The circuit of claim 4, wherein timing at which the gain calculating circuit ends setting the gain is controlled by the selected one of the gate control signal and the register control signal.

7. The circuit of claim 6, wherein the timing at which the gain calculating circuit ends setting the gain is further controlled by:
  a register line control signal input to the gain calculating circuit from the outside in synchronization with the line synchronization signal, the register line control signal indicating a number of lines of the image data to be processed by the gain control circuit.

8. The circuit of claim 1, further comprising:
  a register coupled to the gain calculating circuit and configured to store at least one of the determination result and a resultant signal level of image data obtained by amplifying with the gain having the adjusted value.

9. An image reading device, comprising:
  an optical writing device configured to form an optical image of an original;
  an image sensor configured to convert the optical image into an image signal; and;
  an image signal processing circuit configured to apply signal processing to the image signal, the image signal processing circuit comprising:
    a sample hold circuit configured to sample and hold a specified range of the image signal to output a sampled image signal;
    a variable gain amplifier configured to amplify the sampled image signal with a gain to output an amplified image signal;
    an analog digital converter configured to convert the amplified image signal to image data; and
    a gain control circuit configured to detect a signal level of the image data output from the analog digital converter, determine whether the detected signal level is substantially equal to a target level to generate a determination result, and adjust the gain of the variable gain amplifier based on the determination result such that the detected signal level is made substantially equal to the target level.

10. An image signal processing circuit, comprising:
  an input terminal configured to input an image signal obtained by optically reading image information contained in an original;
  a sample hold circuit coupled to the input terminal and configured to sample and hold a specified range of the image signal to output a sampled image signal;
  an analog digital converter configured to convert the sample image signal to image data;
  a digital amplifier configured to amplify the image data with a gain being a multiplier coefficient to output amplified image data through an output terminal;
  a gain control circuit coupled to the digital amplifier and the output terminal and configured to control the gain of the digital amplifier based on the amplified image data, the gain control circuit comprising:
    a signal level detector configured to detect a signal level of the image data output from the output terminal; and
    a gain calculating circuit configured to determine whether the detected signal level is substantially equal to a target level to generate a determination result, obtain an adjusted value of the gain of the digital amplifier based on the determination result, and sets the gain of the digital amplifier equal to the adjusted value such that the signal level of the amplified image data is made substantially equal to the target level.

11. The circuit of claim 10, wherein the gain control circuit further comprises:
  a gain register configured to store the adjusted value of the gain.

12. The circuit of claim 11, wherein the adjusted value of the gain stored in the gain register is adjusted according to a control signal received from the outside.

13. The circuit of claim 11, wherein timing at which the signal level detector starts detecting the signal level of the image data is controlled by a selected one of:
  a gate control signal input to the gain calculating circuit from the outside in synchronization with a line synchronization signal; and
  a register control signal input to the gain calculating circuit from the outside in synchronization with the line synchronization signal.

14. The circuit of claim 13, wherein the gate control signal specifies a range corresponding to an image effective area of the image signal.

15. The circuit of claim 13, wherein timing at which the gain calculating circuit ends setting the gain is controlled by the selected one of the gate control signal and the register control signal.

16. The circuit of claim 15, wherein the timing at which the gain calculating circuit ends setting the gain is further controlled by:
  a register line control signal input to the gain calculating circuit from the outside in synchronization with the line synchronization signal, the register line control signal indicating a number of lines of the image data to be processed by the gain control circuit.

17. The circuit of claim 10, further comprising:
  a register coupled to the gain calculating circuit and configured to store at least one of the determination result and a resultant signal level of image data obtained by amplifying with the gain having the adjusted value.

18. An image reading device, comprising:
  an optical writing device configured to form an optical image of an original;
  an image sensor configured to convert the optical image into an image signal; and;
  an image signal processing circuit configured to apply signal processing to the image signal, the image signal processing circuit comprising:
    a sample hold circuit configured to sample and hold a specified range of the image signal to output a sampled image signal;
    an analog digital converter configured to convert the sampled image signal to image data;
    a digital amplifier configured to amplify the image data with a gain being a multiplier coefficient to output amplified image data through an output terminal; and
    a gain control circuit configured to detect a signal level of the image data output from the output terminal, determine whether the detected signal level is substantially equal to a target level to generate a determination result, and adjust the gain of the digital amplifier based on the determination result such that the detected signal level is made substantially equal to the target level.

* * * * *